United States Patent [19]

Fujiwara et al.

[11] Patent Number: 5,606,950
[45] Date of Patent: Mar. 4, 1997

[54] DEVICE FOR CONTROLLING THE QUANTITY OF INTAKE AIR TO BE SUPPLIED TO AN ENGINE

[75] Inventors: Toru Fujiwara; Tadashi Tubakiji, both of Himeji, Japan

[73] Assignee: Mitsubishi Denki Kabushiki Kaisha, Tokyo, Japan

[21] Appl. No.: 546,077

[22] Filed: Oct. 20, 1995

[30] Foreign Application Priority Data

Oct. 27, 1994 [JP] Japan .................................. 6-264022

[51] Int. Cl.$^6$ .............................. F02D 11/10; F02D 9/02; F02D 41/22
[52] U.S. Cl. ..................... 123/399; 123/361; 318/254
[58] Field of Search ..................... 123/352, 361, 123/399; 180/178, 179, 197; 318/254, 439, 685, 696

[56] References Cited

U.S. PATENT DOCUMENTS 4,963,800  10/1990  Kajiwara et al. ................ 123/399 X
5,113,824  5/1992  Haubner ............................ 123/399
5,433,283  7/1995  Shultz et al. ................... 123/361 X

FOREIGN PATENT DOCUMENTS 1-315641  12/1989  Japan .
5-240070  9/1993  Japan .

*Primary Examiner*—Tony M. Argenbright
*Attorney, Agent, or Firm*—Sughrue, Mion, Zinn, Macpeak & Seas

[57] ABSTRACT

A device for controlling the quantity of intake air to be supplied to an engine, including a motor controller 22 for calculating a phase current value to be supplied to a stator winding, based on an opening deviation of a throttle valve 11, and for outputting a PWM duty signal corresponding to the calculated phase current value, a motor driver 23 for supplying a current to a brushless motor 15 based on instructions from the motor control unit 22, and a first duty correcter 22a for correcting the PWM duty signal in accordance with a hysteresis torque produced as the throttle valve is driven.

19 Claims, 13 Drawing Sheets

DEVICE FOR CONTROLLING THE QUANTITY OF INTAKE AIR TO BE SUPPLIED TO AN ENGINE

BACKGROUND OF THE INVENTION

1. Field of the Invention

The present invention relates to a device for controlling intake air quantity in which a throttle valve is rotated by a brushless motor to control the quantity of intake air to be supplied to an engine.

2. Description of the Related Art

In automobiles, a throttle valve is provided in the intake air passageway of the engine. This throttle valve is opened and closed in conjunction with the operation of an accelerator pedal by the operator. Therefore, the quantity of intake air to be supplied to the engine is controlled according to an operation quantity (a quantity of depression) of the accelerator pedal.

Such control of intake air quantity is accomplished by coupling the throttle valve and the accelerator pedal through a mechanical coupling means such as a link or a wire. However, since such mechanical coupling means limits the positional relation of the accelerator pedal and the throttle valve, the problem of a reduced degree of freedom for mounting positions in an automobile has existed.

Further, in recent years, controlling the throttle valve independently of the operation of the accelerator pedal by an operator has become necessary for controlling cruise control devices or traction control devices. Therefore a method of electrically coupling a throttle valve and a motor has been proposed. For example, the control of a throttle valve as disclosed in Japanese Patent Laidopen No. HEI 1-315641 is well-known. If a motor with a brush commutator is used, the pressure applied to the motor by the brush commutator will cause hysteresis torque to be produced in the positive-rotation(forward) and negative-rotation(reverse) directions of a rotor and therefore position control will become difficult. For this reason, in the above-described reference, a brushless motor is used to control the throttle valve.

Further, in the control of a throttle valve disclosed in Japanese Patent Laidopen No. HEI 5-240070, the rotor of a brushless motor and the rotational shaft of a throttle valve are coupled through a speed reducer in the form of gears to control the throttle valve with a high degree of accuracy.

Also, in order to switch the stator windings (hereinafter referred to as phases) of a brushless motor, a counter electromotive force detector for detecting a counter electromotive force at a phase and a current switch detector are provided, thereby requiring a rotation detector which is expensive and highly precise.

However, in devices for controlling the quantity of intake air which perform the above-described conventional control a throttle valve, there are the following two problems.

First, in the device disclosed in the above Japanese Patent Laidopen No. HEI 1-315641 and Japanese Patent Laidopen No. HEI 5-240070, even if a brushless motor were used, the hysteresis torque with respect to rotational direction will not be eliminated because of the existence of bearings supporting the rotational shaft of a throttle valve, a sealing member preventing infiltration of foreign substances from the outside, a speed reducer and gears, a return spring for closing a throttle valve when an abnormality occurs, and frictional resistance between the sliding parts other than the brush commutator, such as the sliding parts inside the brushless motor.

With respect to this point, a measured example of the driving torque characteristics of a throttle actuator constructed with a brushless motor will be described with reference to FIG. 12. In the figure, the abscissa represents throttle opening ratio and the ordinate represents driving torque. When the throttle valve is driven in its opening direction the driving torque of the throttle actuator changes along the upper characteristic and when the throttle valve is driven in its closing direction it moves along the lower characteristic. The difference in the driving torques generated by the different opening and closing directions is called hysteresis torque. Note that the driving torque characteristic rises to the right with the same slope as the spring constant of a return spring.

The driving torque is proportional to a phase current Is (=PWM duty), so the ordinate can be replaced with the phase current Is. When the current degree of throttle opening is shifted to the next degree of throttle opening by the position feedback control of the throttle valve using a motor, the phase current Is is increased or decreased from its current value to increase or decrease the driving torque of the motor. However, since the throttle valve will not move in the hysteresis torque range even if the phase current is changed, response properties will be hindered. This problem is particularly evident in the fine control of throttle opening where the degree of movement of the throttle opening (quantity of change in the phase current) is small.

Second, there is the problem that the drive of a brushless motor, when, based on the outputs of a counter electromotive force detector and a current change detector, a certain current conducting phase is switched to the next current conducting phase, the current abruptly changes. Therefore, when there is a delay between the change in magnetic flux applied to the phase and the above-described detector output, the torque generated by the motor becomes discontinuous, as will be described later. As a result, the degree of throttle opening changes abruptly.

The principles of the above problem will be described with reference FIG. 13.

As is apparent from FIG. 13, the phase current to be conducted through each winding (phase) is conducted based on the detector output (for example, a detector for generating an output signal every 30 degrees) corresponding to the magnetic flux density where each phase crosses, as a rotor is rotated. For example, if it is determined by the detector output that an A-phase winding has crossed with a magnetic flux density of predetermined size, a current will be conducted to the A-phase winding. Next, when the motor shaft is rotated and the magnetic flux density moves to a C-phase winding, a current will be conducted to the C-phase winding in the same manner. Next, a current is likewise conducted to a B-phase winding. That is, the current conducting phases are cyclically switched while they are overlapped by 30 degrees each. By this type of ideal switching of phases where the phases are linked with the magnetic flux density change where the phases cross in the way described above, a motor shaft torque (indicated by the solid line in the figure) wherein the torques generated in the phases are continuously linked is obtained.

However, if it is now assumed that the output signal of the detector lags in the direction indicated by the arrow shown in FIG. 13, the conducting angle of the A-phase will increase and the conducting angle of the B-phase will decrease, so the motor shaft torque will be discontinuous (shown by the broken line). Since the motor shaft torque abruptly increases at this point of discontinuity, the degree of throttle opening changes abruptly. On the other hand, as is clear from the description above, it is necessary that the mounting position of the detector which acts as a reference for switching current conducting phases be highly accurate with respect to the position of the stator winding. However, due to variations in production etc. the problem that the above-described lag cannot be completely eliminated remains.

In order to overcome this problem, it is conceivable to adopt a three-phase conducting system in which a current is independently supplied in the form of a sine wave for each of the A-phase, B-phase, and C-phase, but such a system would have the problem that it requires a detector for accurately measuring the angle of rotation of a motor rotor.

SUMMARY OF THE INVENTION

This invention has been made to solve the conventional problems described above. Accordingly, it is an important object of the present invention to provide a device for controlling the quantity of intake air to be supplied to an engine which is inexpensive and has excellent controllability.

According to one aspect of the invention, there is provided a device for controlling the quantity of intake air to be supplied to an engine, comprising:

a throttle valve provided in an air intake passageway of the engine and supported by a rotational shaft;

a brushless motor having stator windings and a rotor coupled through a speed reducer to the rotational shaft;

a throttle opening sensor for detecting an angle of rotation of the rotational shaft to detect an actual degree of opening of the throttle valve;

a target opening set means for setting a target degree of throttle opening based on various kinds of vehicle information;

motor control means for calculating a phase current value to be supplied to each of the stator windings based on an opening deviation between the actual degree of throttle opening obtained by the throttle opening sensor and the target degree of throttle opening set by the target opening set means, and for outputting a PWM duty corresponding to the calculated phase current value;

motor drive means for supplying a current to the brushless motor based on instructions from the motor control means; and correction means for correcting the PWM duty in accordance with hysteresis torque produced when the throttle valve is driven.

With this arrangement, the correction means cancels the hysteresis torque caused by the frictional resistance between sliding parts constituting a control object, and can enhance controllability.

According to another aspect of the invention, there is provided a device for controlling a quantity of intake air to be supplied to an engine, comprising:

a throttle valve provided in an air intake passageway of the engine and supported by a rotational shaft;

a brushless motor having stator windings and a rotor coupled through a speed reducer to the rotational shaft;

a throttle opening sensor for detecting an angle of rotation of the rotational shaft to detect an actual degree of opening of the throttle valve;

a target opening set means for setting a target degree of throttle opening based on various kinds of vehicle information;

a rotational angle detection means for obtaining an angle of rotation of the rotor based on an output signal of the throttle opening sensor;

motor control means for independently calculating phase current values to be supplied to the stator windings based on an output signal of the rotational angle detection means and based on an opening deviation between the actual degree of throttle opening obtained by the throttle opening sensor and the target degree of throttle opening set by the target opening set means, and for outputting a PWM duty corresponding to each of the calculated phase current values; and motor drive means for supplying a current to the brushless motor based on instructions from the motor control means.

With this arrangement, the rotational angle detection means detects an angle of rotation of the rotor of the brushless motor. Based on the detected angle of this rotational angle detection means, the motor control means independently controls phase currents to be supplied to the rotor windings. As a result, abrupt torque fluctuations in brushless motors can be prevented which would otherwise occur when the stator winding (phase) to which a current is supplied is switched.

In a preferred form of the invention, when the opening deviation occurs, the correction means increases or decreases, with respect to the PWM duty output by the motor control means, a predetermined duty in accordance with the polarity of the opening deviation to correct the PWM duty.

In this arrangement, the correction means increases or decreases, with respect to the PWM duty, the predetermined duty corresponding to the phase current value equivalent to a hysteresis torque according to the polarity of the opening deviation. As a result, the hysteresis torque can be cancelled.

In another preferred form of the invention, the correction means overlaps a predetermined duty on the PWM duty output by the motor control means with a constant cycle to correct the PWM duty.

In this arrangement, the correction means overlaps a predetermined duty corresponding to a phase current value equivalent to a hysteresis torque on the PWM duty with a constant cycle. As a result,. the hysteresis torque can be cancelled.

In a further preferred form of the invention, the throttle opening sensor is of a non-contact type.

If a predetermined duty is overlapped on the PWM duty with a constant cycle, the throttle valve will not oscillate much at the overlapped cycle. Therefore, by using a non-contact type throttle opening sensor, the life of the present device can be made longer, as compared with a conventional contact type throttle opening sensor.

In a further preferred form of the invention, the device further comprises hysteresis correction means for detecting the hysteresis torque from a relationship between a phase current flowing through the stator winding and the actual degree of throttle opening and correcting the predetermined duty value that the correction means outputs.

With this arrangement, the hysteresis correction means detects an actual hysteresis torque from a relationship between a phase current flowing through the stator winding and the actual degree of throttle opening, and corrects the predetermined duty value that the correction means outputs. Therefore, the hysteresis torque can be cancelled more accurately.

In a further preferred form of the invention, the device further comprises voltage correction means for correcting the predetermined duty value output by the correction means based on a power supply voltage.

With this arrangement, the voltage correction means corrects based on the power supply voltage a predetermined duty value output by the correction means. As a result, the phase current based on the PWM duty can be prevented from being changed by the power supply voltage, and the hysteresis torque can be cancelled more accurately.

In a preferred form of the invention, the device further comprises correction means for correcting the PWM duty in accordance with hysteresis torque produced as the throttle valve is driven.

With this arrangement, the correction means cancels the hysteresis torque caused by the frictional resistance between sliding parts constituting a control object, and can enhance controllability.

In a further preferred form of the invention, the device further comprises position detection means for detecting a position of the rotor, and the rotational angle detection means obtains the angle of rotation of the rotor, based on an output signal of the position detection means and an output signal of the throttle opening sensor.

With this arrangement, the position detection means detects a position of the rotor, and the rotational angle detection means detects the angle of rotation of the rotor of the brushless motor, based on the position of the rotor and based on the angle of rotation of the rotational shaft which is an output signal of the degree of throttle opening sensor.

In a further preferred form of the invention, a reference position signal representative of a relative position between the rotor and the stator winding is determined and the rotational angle detection means obtains the angle of rotation of the rotor, based on the reference position signal and an output signal of the degree of throttle opening sensor.

With this arrangement, the rotational angle detection means detects the angle of rotation of the rotor of the brushless motor, based on the reference position signal representative of a relative position between the rotor and the stator winding and based on the angle of rotation of the rotational shaft which is an output signal of the degree of throttle opening sensor.

In a further preferred form of the invention, a full closed position signal of the throttle valve is used as the reference position signal.

With this arrangement, the full closed position signal of the throttle valve can be used as a reference position signal.

In a further preferred form of the invention, the rotational angle detection means is constituted by arranging the degree of throttle opening sensor at a position where the angle of rotation of the rotor can be determined.

With this arrangement, the rotational angle detection means which detects the angle of rotation of the rotor of the brushless motor can be constituted by arranging the throttle opening sensor at a predetermined position.

The above and other objects, features and advantages of the present invention will become apparent from the following detailed description of the preferred embodiments of the invention when is read in conjunction with the accompanying drawings.

DETAILED DESCRIPTION OF THE PREFERRED EMBODIMENTS

Embodiments of the present invention will hereinafter be described in detail with reference to the accompanying drawings.

First Embodiment

Figure 1:
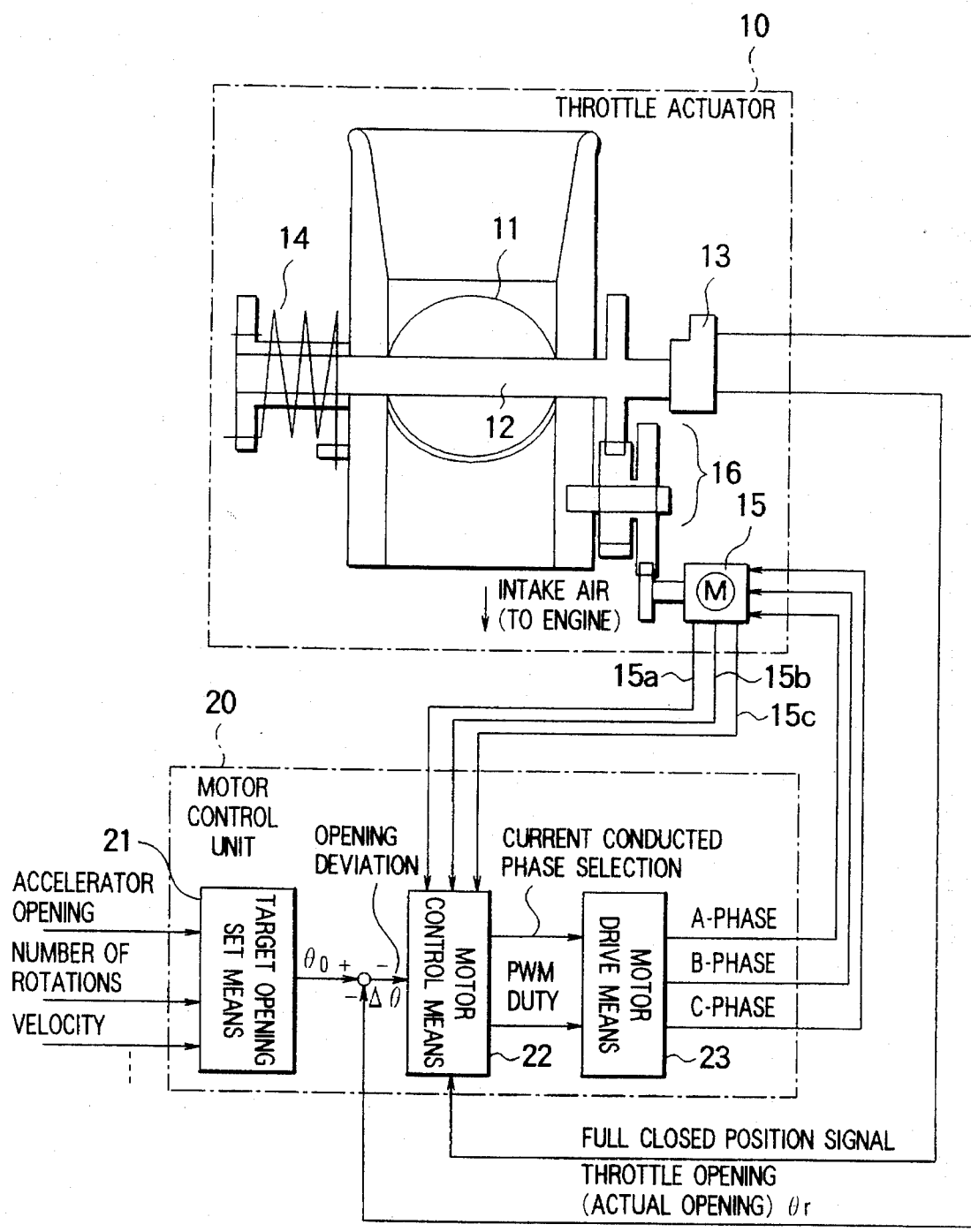
FIG. 1 is a block diagram showing a device for controlling a quantity of intake air of the present invention.

FIG. 1 shows a device for controlling a quantity of intake air to be supplied to an engine, constructed in accordance with a first embodiment of the present invention. A throttle actuator 10 for regulating a quantity of intake air to be supplied to an engine (not shown) comprises a throttle valve 11 for varying an opening area of an intake air passageway, a rotational shaft 12 for supporting the throttle valve 11, a degree of throttle opening sensor 13 provided on one axial end of the rotational shaft 12 for sensing an angle of rotation (degree of throttle opening) of the rotational shaft 12 and a full closed position of the throttle valve 11, a return spring 14 provided on the other axial end of the rotational shaft 12 for urging the throttle valve 11 toward the closing direction of the valve 11, a brushless motor 15 having position detection sensors 15a to 15c in the interior, and a speed reducer 16 for coupling the rotational shaft 12 and the brushless motor 15.

A motor control unit 20 for controlling the brushless motor 15 comprises target opening set means 21 for calculating a target throttle opening $\theta_0$ in response to various vehicular information (accelerator opening representative of the amount an accelerator pedal is pressed by (not shown) an operator, engine rpm, speed, etc.). The motor control unit 20 further comprises motor control means 22 for selecting a current conducted phase of the motor in response to signals from the position sensors 15a to 15c and a full-closed position signal of the throttle opening sensor 13 and also calculating a PWM ratio in response to an opening deviation θ between the target throttle opening $\theta_0$ calculated by the target opening set means 21 and an actual opening θ r from the throttle opening sensor 13. The motor control unit 20 further comprises motor drive means 23 for supplying a current to each phase in response to a result of the two calculations from the motor control means 22 (current conducted phase selection signal and PWM duty).

Figure 2:
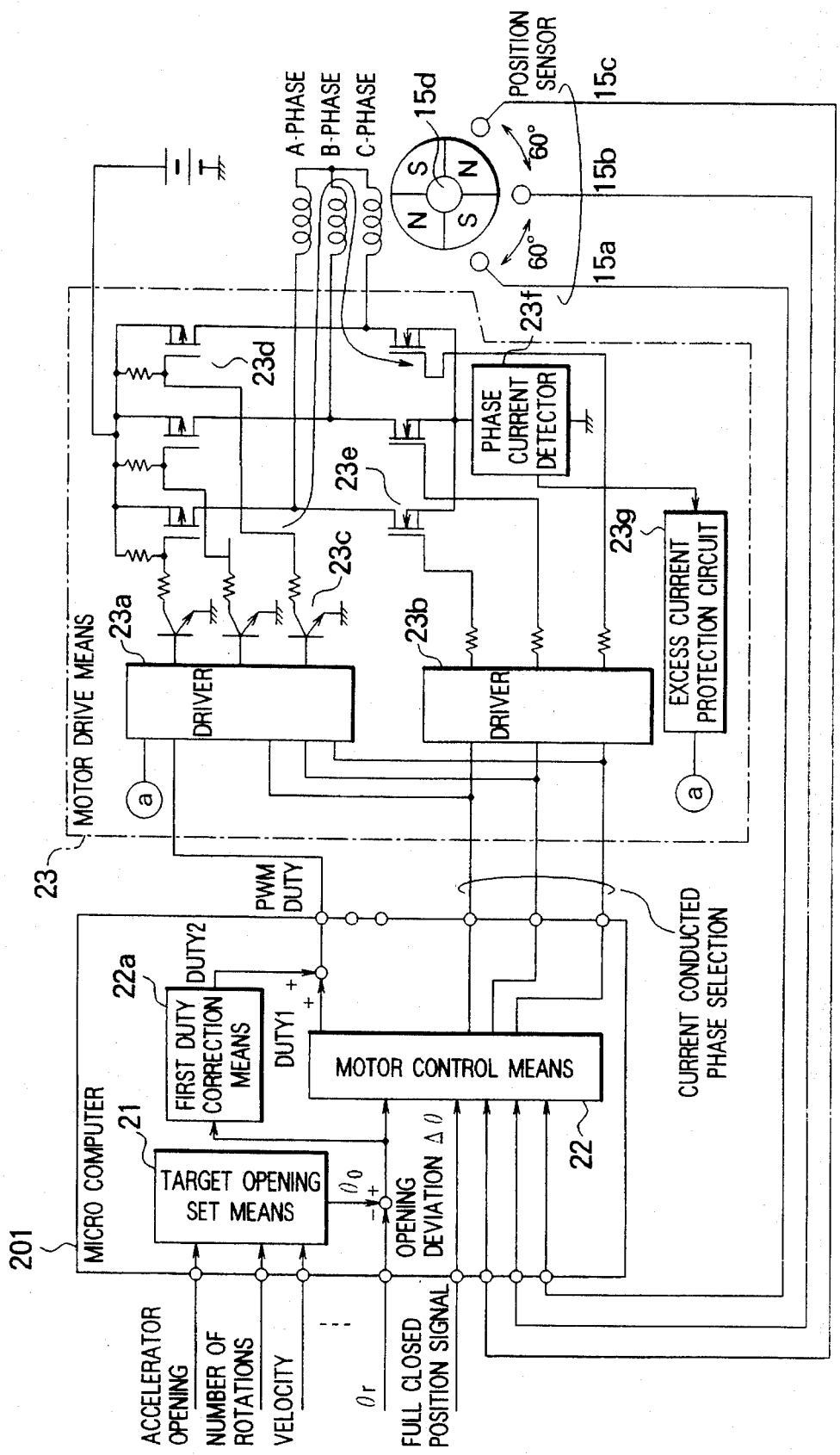
FIG. 2 is a circuit diagram showing a control unit of a first embodiment of the present invention.

FIG. 2 is a circuit diagram showing the control unit 20 of FIG. 1.

A microcomputer 201 is comprised of the above-described target opening set means 21 and motor control means 22, and first duty correction means 22a for correcting a PWM duty from the above-described opening deviation Δθ. Motor drive means 23 includes a driver 23a comprising a logic circuit for driving an upstream drive stage in response to the current conducted phase selection signal from the microcomputer 210, a first stage switching element group 23c, a final stage switching element group 23d, a driver 23b comprising a logic circuit for driving a downstream drive stage, and a final stage switching element group 23e. The motor drive means 23 further includes a phase current detector 23f for detecting a current passing through a current conducted phase and an excess-current protection circuit 23g. The output of the excess-current protection circuit 23g is input to the driver 23a.

An A-phase, a B-phase, and a C-phase of the brushless motor 15 are connected through the final stage switching element groups 23d, 23e and the phase current detector 23f between a power supply and ground. The position sensors 15a to 15c for detecting the position of the four pole magnet of a rotator 15d are arranged at intervals of 60 degrees. The output of each position sensor is input to the motor control means 22.

Also, the above-described full-closed position signal representative of the full closed position of the throttle valve 11 is input to the motor control means 22.

Next, the operation will be described.

The opening deviation Δθ which is a difference between a target throttle opening $\theta_0$ adapted to various vehicular information (accelerator opening, engine rpm, vehicle speed, etc.) and an actual opening θ r obtained by the throttle opening sensor 13 is input to the motor control means 22:

$$\Delta\theta = \theta_0 - \theta r. \quad (1)$$

When Δθ is positive, the motor control means 22 increases the phase current of the brushless motor because an actual throttle opening is smaller than a target opening. When, on the other hand, Δθ is negative, the motor control means 22 decreases the phase current of the brushless motor because an actual throttle opening is greater than a target opening. A PID controller is widely used to calculate a PWM duty (phase current) from Δθ. The PID controller is expressed by the following equation and controls a phase current so that Δθ becomes 0:

$$\text{duty } 1 = K_p \cdot \Delta\theta + K_i \cdot \Sigma\Delta\theta dt + K_d \cdot \Delta\theta/dt. \quad (2)$$

(where duty 1 represents the PWM duty calculated by the PID controller, Kp represents a proportional gain, Ki represents an integral gain, and Kd represents a differential gain).

If Δθ occurs, the first duty correction means 22a will add or decrease a predetermined constant duty to the polarity of Δθ (positive and negative of Δθ). This duty is equivalent to a phase current corresponding to the hysteresis torque (FIG. 12) that the throttle actuator has, and serves to cancel the friction resistance of the throttle actuator when the throttle valve starts moving from a current opening (i.e., when ±θ occurs):

$$\begin{aligned}\text{duty } 2 &= +\alpha & \text{(when } \Delta\theta \text{ is positive)} \\ &= -\alpha & \text{(when } \Delta\theta \text{ is negative)}.\end{aligned} \quad (3)$$

where duty 2 represents a PWM duty obtained by the first duty correction means and a represents a correction duty equivalent to hysteresis torque.

Next, the sum of the PWM duty calculated by the PID controller and the PWM duty obtained by the first correction means is output as a PWM duty to the outside of the microcomputer 201:

$$PWM \text{ duty} = \text{duty } 1 + \text{duty } 2 \quad (4)$$

Figure 13:
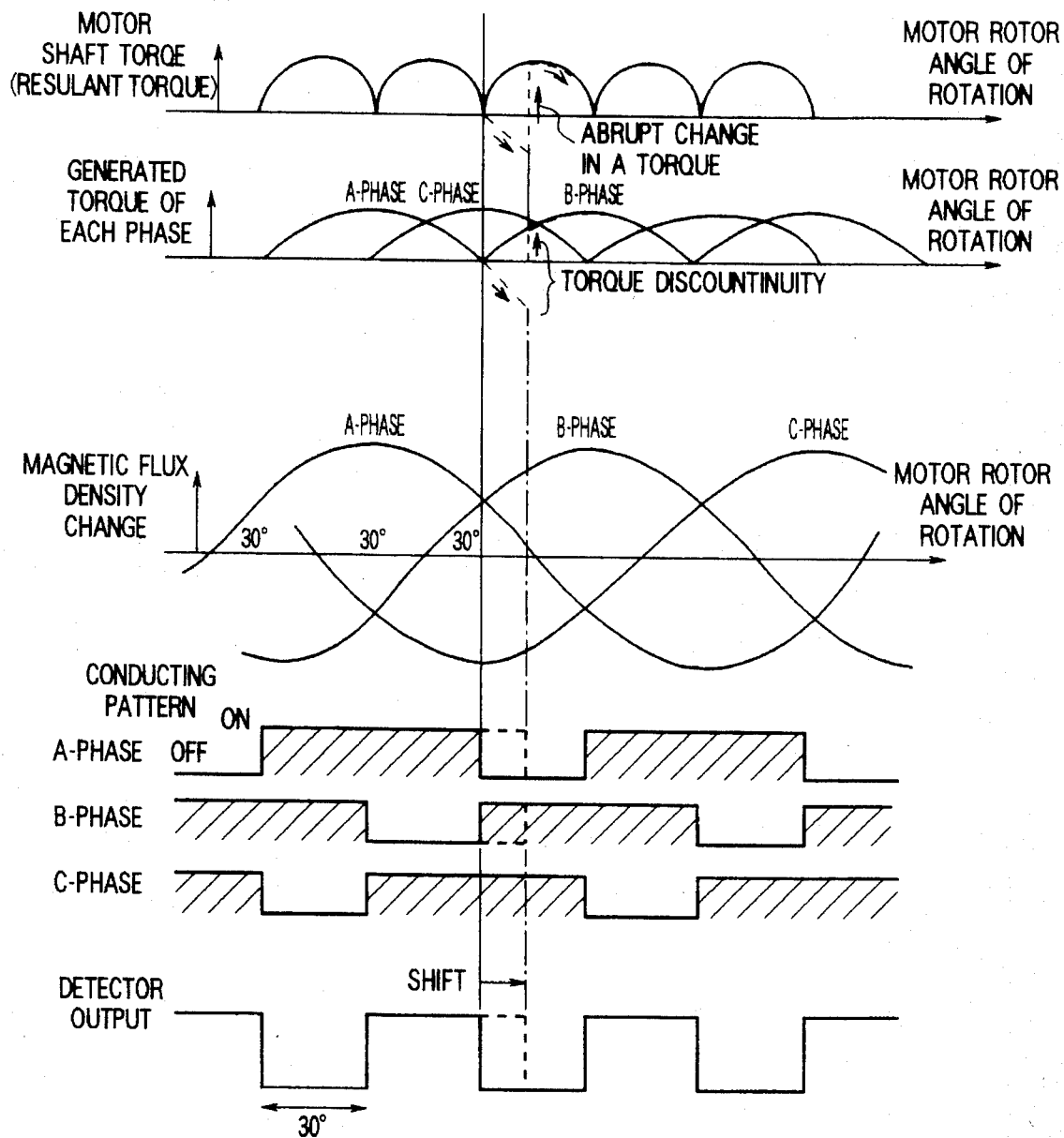
FIG. 13 is a diagram used to explain the principles of a conventional conducting method using an output of a motor angle-of-rotation detector.

On the other hand, a current conducted phase is determined based on the position of the magnet of the rotor 15d of the brushless motor 15, i.e., the outputs of the position sensors 15a to 15c for detecting a magnetic flux density applied to a phase. A method of determining a current conducted phase is as described in FIG. 13, and the detector output shown in the figure is obtained from the outputs of the position sensors 15a to 15c. Based on the conducting patterns (FIG. 13) determined by the detector output, a current conducted phase is selected. A technique for generating the detector output from the position sensor at intervals of 30 degrees is not related directly to the present invention, so a description thereof is omitted.

The PWM duty and current conducted phase selection result calculated in the ways described above are transferred to the motor drive means 23.

Next, the operation of the motor drive means 23 will be described. In response to the current conducted phase selection signal, the drivers 23a and 23b drive switching elements corresponding to that signal into a closed-loop state (where a current flows) so that a current is supplied by a power supply. At the same time, the drivers 23a and 23b drive the upstream switching group in response to the PWM duty supplied by the microcomputer 201. The PWM drive used herein is a method in which the duty of an ON time and an OFF time within one cycle of a certain drive frequency (for example, 10 kHz) is controlled to vary a current. When duty =0%, the phase current becomes 0, and when duty=100%, the current will be determined by power supply voltage and winding resistance if losses such as wiring loss are ignored. Between 0% and 100%, the PWM duty is controlled to obtain a phase current having an arbitrary intensity:

$$Is = (V_b/R_s) \times PWM \text{ duty}, \quad (5)$$

(where Is represents a phase current, Vb represents a power supply voltage, and Rs represents a phase resistance of two phases).

For example, if the microcomputer 201 sends the current conducted phase selection signal to instruct the motor drive means 23 to supply a current to the winding A to C phases, the left element of the upstream final stage switching element group 23d and the right element of the downstream final stage switching element group 23e will be closed. Further, the upstream final stage switching elements are turned on and off at high speed with the PWM duty instructed by the microcomputer 201. As a result, a desired current is supplied from the A-phase to the C-phase.

Further, the phase current is detected by the phase current detector 23f, and the value of the detected phase current is monitored at all times by the excess current protection circuit 23g. The excess current protection circuit 23g has a fail safe function that when it detects an abnormal current exceeding a current set within a predetermined range of normal operation, it translets the result of detection to the driver 23a to forcibly stop the current.

The above-described full-closed position signal is used in the training and fail detection of the throttle opening sensor 13 at the full-closed position of the throttle valve.

The above-described calculation of the PWM duty and process of the current conducted phase selection will be described with reference to FIGS. 3 and 4.

Figure 3:
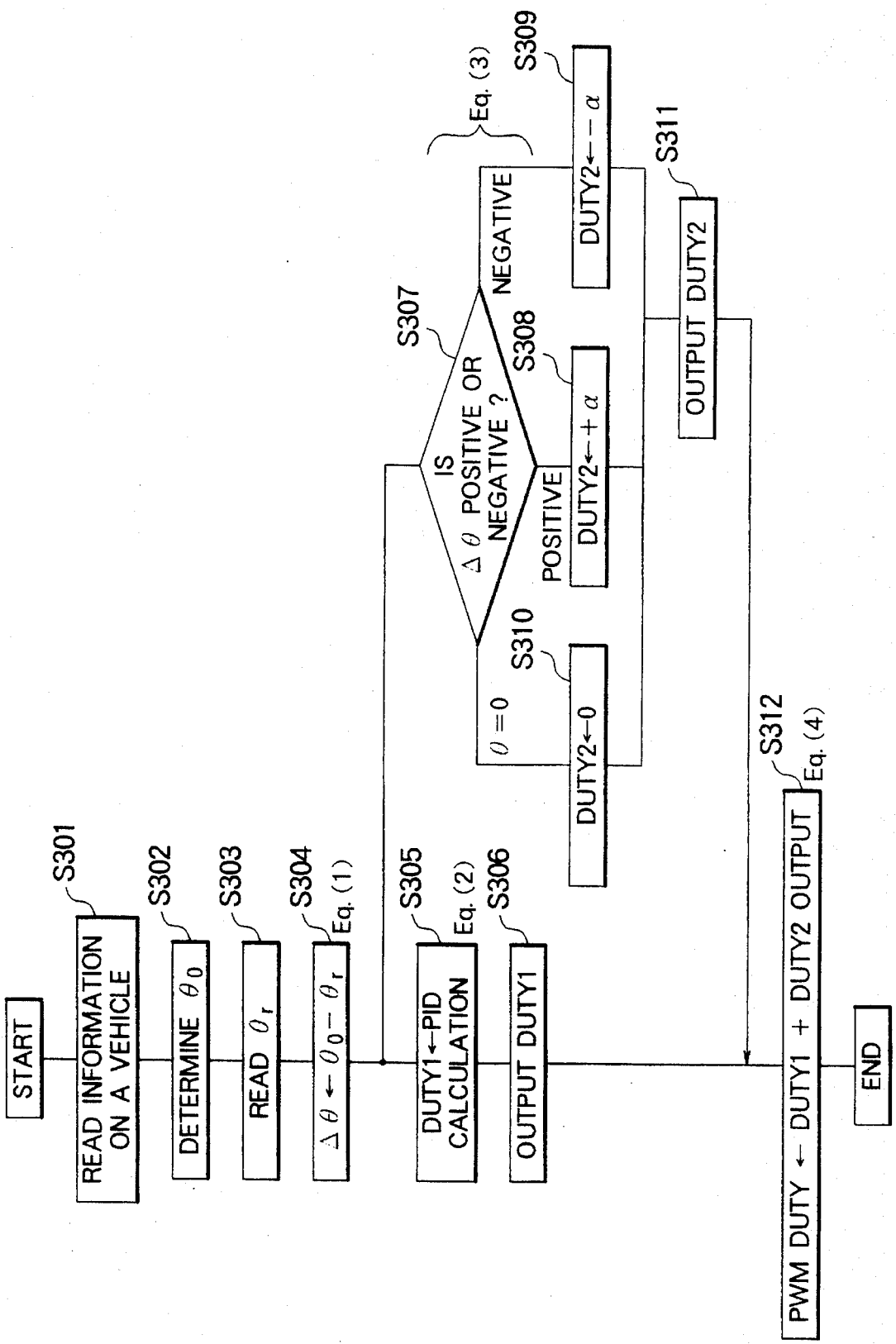
FIG. 3 is a flowchart showing how the control duty of the first embodiment is determined.

In FIG. 3, motor control means 22 reads information on a vehicle such as degree of accelerator opening, engine rpm, and vehicle speed (S301). From the information, a target throttle opening $\theta_0$ is obtained (S302), and an actual opening $\theta r$ is read from the throttle opening sensor 13 (S303). A deviation $\Delta\theta$ between $\theta_0$ and $\theta r$ is calculated with Equation (1) (S304). With Equation (2), duty 1 is obtained from $\Delta\theta$ by the above-described PID calculation (S305), and the duty 1 obtained is output (S306).

On the other hand, first duty correction means 22a determines if the $\Delta\theta$ obtained in S304 is positive or negative (S307). As shown in Equation (3), when $\Delta\theta$ is positive, duty 2 is set to $+\alpha$ (S308). When $\Delta\theta$ is negative, the duty 2 is set to $-\alpha$ (S309). When $\Delta\theta$ is 0, the duty 2 is set to 0 (S310). The duty 2 thus obtained is output (S311).

Then, with Equation (4), the output (duty 1) of the motor control means 22 and the output (duty 2) of the first duty correction means 22a are added up and output as a PWM duty by the microcomputer 201 (S312).

Figure 4:
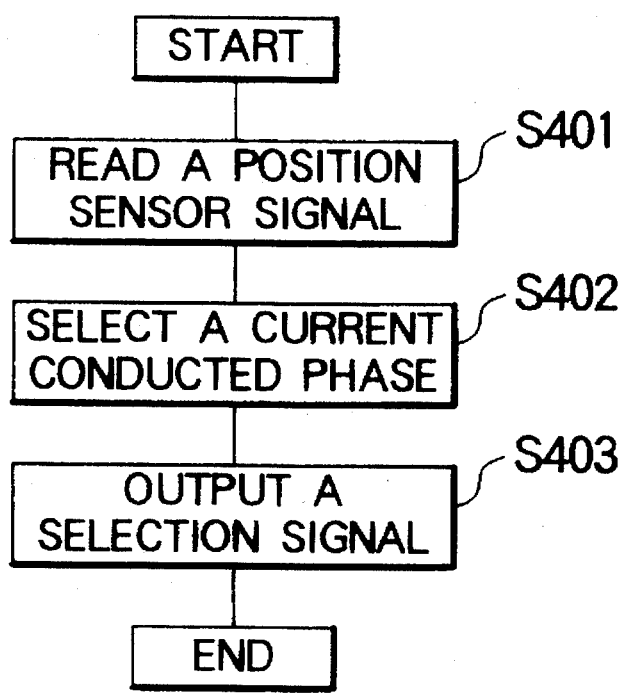
FIG. 4 is a flowchart showing how a current conducted phase of the first embodiment is determined.

In FIG. 4, the output of each of the position sensors 15a to 15c is read (S401), and from a conducing pattern determined by the form of the output signal, a current conducted phase is determined (S402). The current conducted phase thus determined (current conducted phase selection signal) is output to the motor drive means 23 (S403).

Second Embodiment

Figure 5:
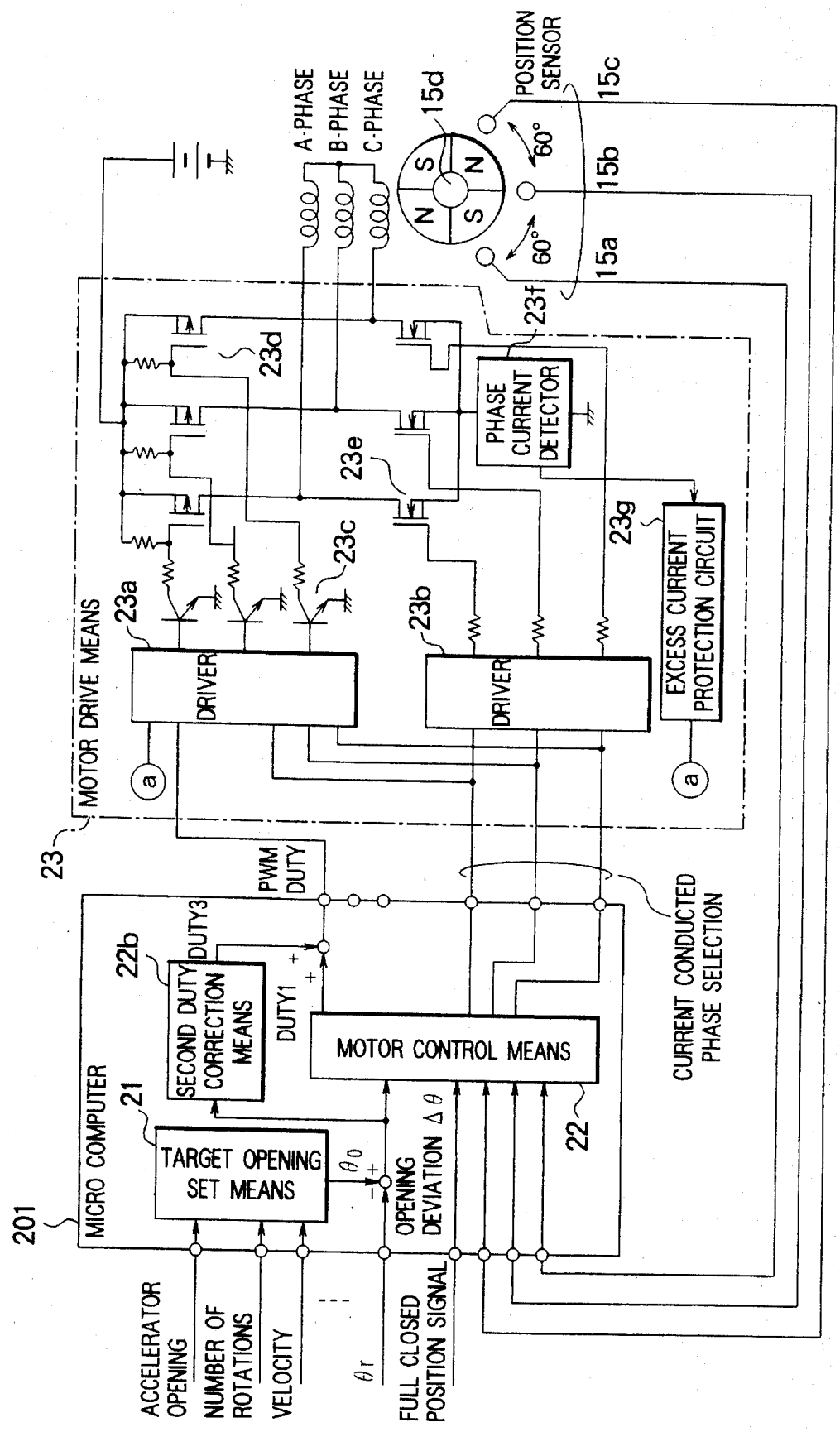
FIG. 5 is a circuit diagram showing a control unit of a second embodiment of the present invention.

The second embodiment of the present invention will hereinafter be described. The entire constitution of the second embodiment is the same as that of the first embodiment shown in FIG. 1, so only the control unit 20 of the second embodiment will be described with FIG. 5.

Reference numeral 201 denotes a microcomputer, which comprises the above-described target opening set means 21 and motor control means 22, and second duty correction means 22b for correcting a PWM duty.

Motor drive means 23 is the same as the first embodiment and therefore includes a driver 23a comprising a logic circuit for driving an upstream drive stage, a first stage switching element group 23c, a final stage switching element group 23d, a driver 23b comprising a logic circuit for driving a downstream drive stage, a final stage switching element group 23e, a phase current detector 23f, an excess-current protection circuit 23g, A-phase to C-phase of a brushless motor, and position sensors 15a to 15c for detecting the position of the four pole magnet of a rotator 15d.

Next, the operation will be described. Equations which express an opening deviation $\Delta\theta$ and a PWM duty are the same as Equations (1) and (2) described in the first embodiment.

The second duty correction means 22b outputs a predetermined quantity of duty where the positive and negative signs thereof are inverted at intervals of a predetermined cycle longer than the cycle of the PWM duty. That is, an operation of outputting a predetermined positive duty for a constant period and then outputting a predetermined negative duty for the next constant period is repeated as one cycle $T_0$. This duty is equivalent to a phase current corresponding to the hysteresis torque (FIG. 12) that the throttle actuator has, and the friction resistance of the throttle actuator is cancelled since the throttle valve vibrates microscopically at intervals of a predetermined cycle:

$$\text{duty 3} = +\beta \quad \text{(when } t < T_0/2\text{),}$$
$$= -\beta \quad \text{(when } t > T_0/2\text{,)} \quad (6)$$

where duty 3 represents a PWM duty obtained by the second duty correction means and $\beta$ represents a correction duty equivalent to hysteresis torque.

Then, the sum of the PWM duty calculated by the PID controller and the PWM duty obtained by the second correction means is output as a PWM duty to the outside of the microcomputer 201:

$$PWM \text{ duty} = \text{duty 1} + \text{duty 3.} \quad (7)$$

The above-described operation will be described with the flowchart of FIG. 6. In the figure, duty 3 has been set to + (S600). Motor control means 22 reads vehicle information such as accelerator opening, engine rpm, and vehicle speed (S601). From the information, a target throttle opening $\theta_0$ is obtained (S602), and an actual opening $\theta r$ is read from the throttle opening sensor 13 (S603). The deviation $\Delta\theta$ between $\theta_0$ and $\theta r$ is calculated with Equation (1) (S604). With Equation (2), duty 1 is obtained from $\Delta\theta$ by the above-described PID calculation (S605), and the result is output (S606). On the other hand, second duty correction means 22b determines if a time t is greater than a predetermined cycle $T_0/2$ (S607). As shown in Equation (6), when t is less than $T_0/2$, duty 3 is set to $+\beta$ (S608). When t is greater than $T_0/2$, the duty 2 is set to $-\beta$ (S609). The duty 3 thus obtained is output (S610).

Then, with Equation (7), the output (duty 1) of the motor control means 22 and the output (duty 3) of the second duty correction means 22b are added up and output as a PWM duty by the microcomputer 201 (S611).

Third Embodiment

Figure 7:
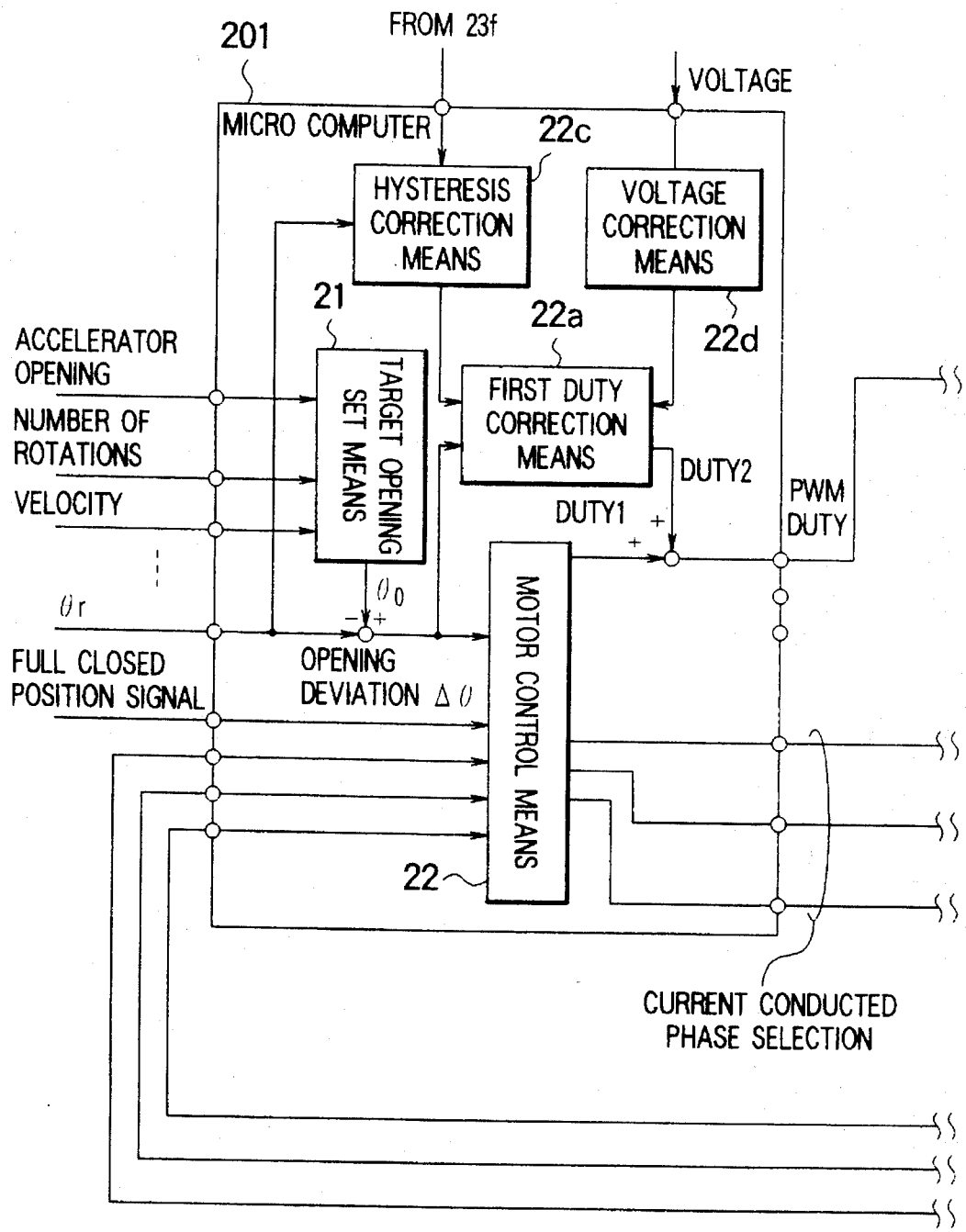
FIG. 7 is a block diagram showing a control unit of a third embodiment of the present invention, the control unit being applied to the constitution of the first embodiment.
Figure 8:
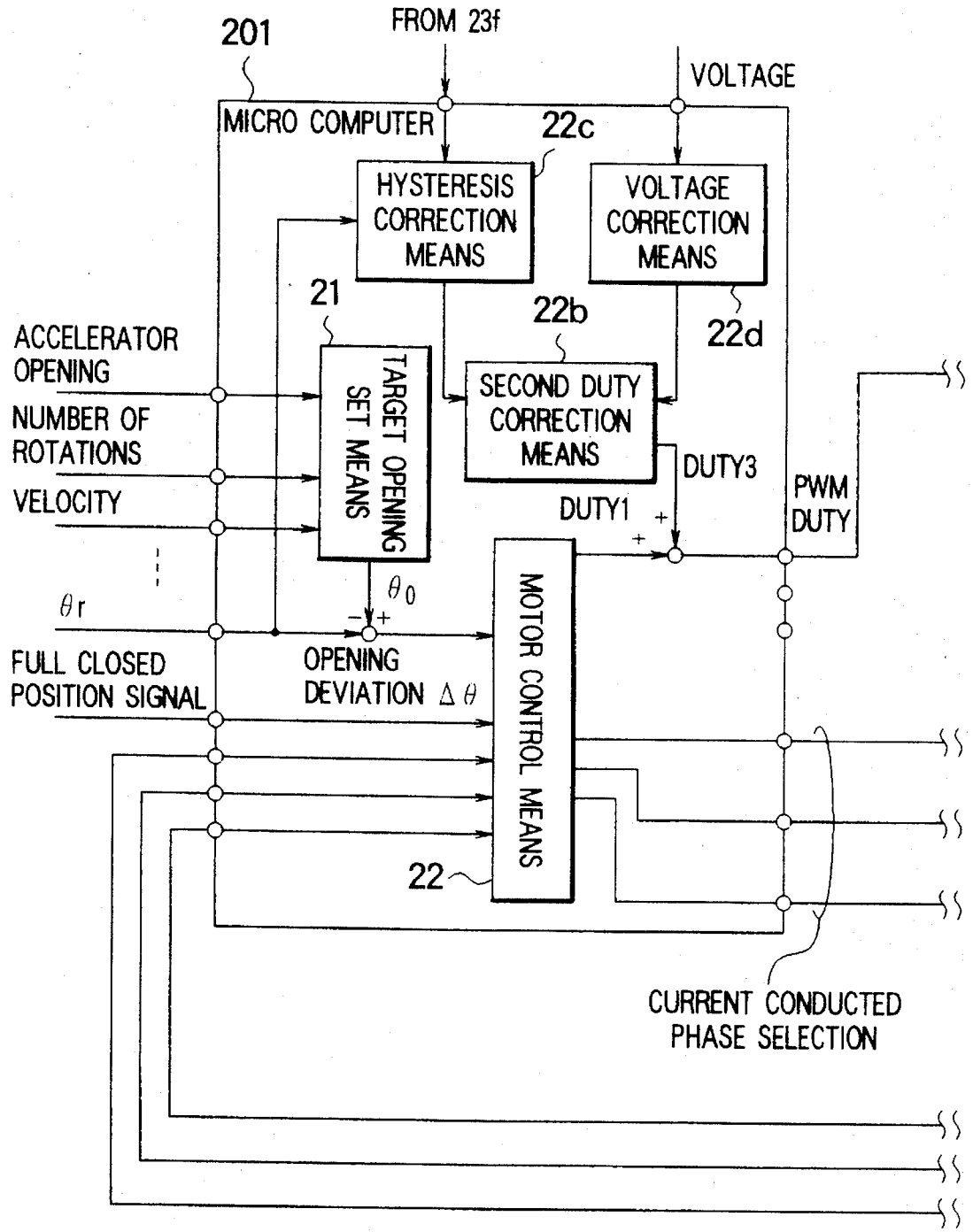
FIG. 8 is a block diagram showing the control unit of the third embodiment of the present invention, the control unit being applied to the constitution of the second embodiment.

A third embodiment of the present invention will hereinafter be described. The third embodiment is substantially identical in construction and operation with the above-described first and second embodiments, so only the parts of control unit 20 that are different will be described. FIGS. 7 and 8 correspond to the first embodiment and the second embodiment, respectively.

As described above, the values of $\alpha$ and $\beta$ set in the first and second duty correction means of the first and second embodiments have been set to be equivalent to the size of the hysteresis that the throttle actuator has.

In FIGS. 7 and 8, there is shown hysteresis correction means 22c.

Figure 12:
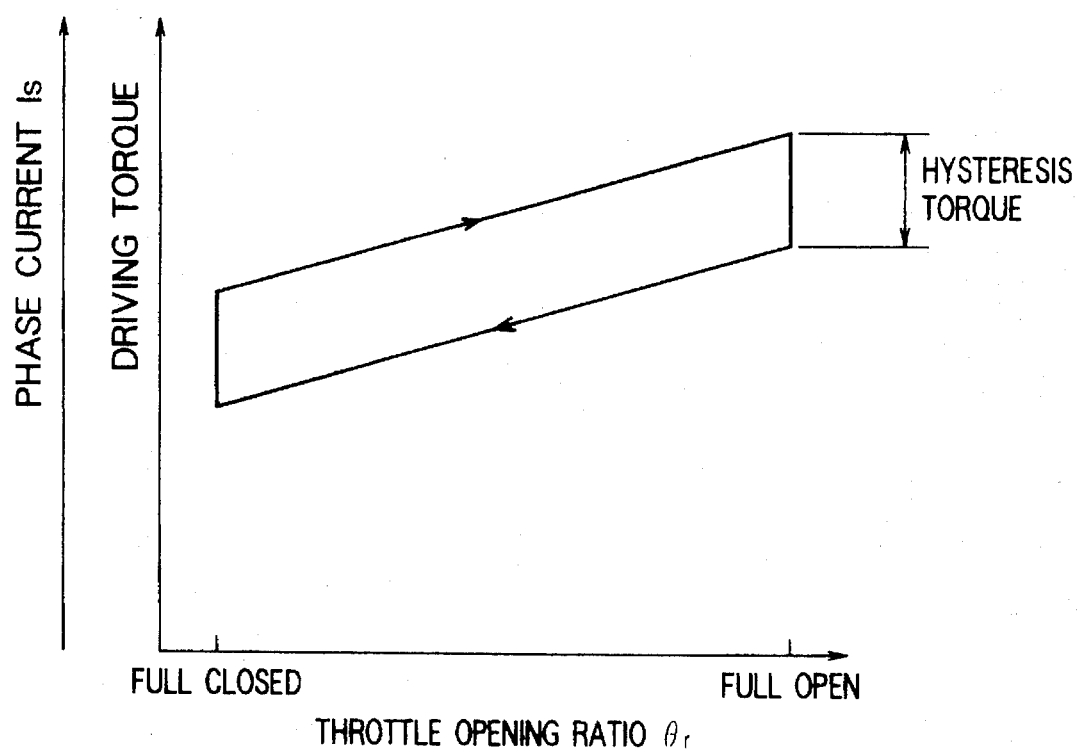
FIG. 12 is a diagram showing the degree of throttle opening versus driving torque characteristics of a throttle actuator using a brushless motor.

Under normal operation, in order to compensate for the characteristic drift of the throttle opening sensor 13 or shift between the structural elements and obtain an accurate actual opening $\theta r$, an initialization is performed in which the throttle valve 11 is rotated at the time of the start or end of operation to confirm (train) the fully closed position or fully open position. From the phase current is detected by the phase current detector 23f and the actual opening θr detected by the throttle opening sensor 13 during this operation, the actual Is-θr characteristics shown in FIG. 12 are measured to obtain an actual hysteresis hys. The correction duties α and β (equivalent to hysteresis) that the first and second duty correction means are given as a function of an actual hysteresis hys, and the values of duty 2 and duty 3 are obtained.

The calculation of the duty 2 and duty 3 as the hysteresis correction means is introduced is given as follows.

| duty 2 | = +α (hys) | (when Δθ is positive) | |
| | = −α (hys) | (when Δθ is negative) | (3a) |
| duty 3 | = +β (hys) | (when t < T₀/2) | |
| | = −β (hys) | (when t > T₀/2) | (6a) |

In FIGS. 7 and 8, voltage correction means 22d is shown. As is apparent from Equation (5) described in the operation of the first embodiment, a phase current is proportional to a power supply voltage. On the other hand, the power supply voltage of an automobile fluctuates depending upon driving conditions, load current, or charged state of a battery. To cope with this, the α and β of duty 2 and duty 3 are given as a function of a power supply voltage Vb.

| duty 2 | = +α (Vb) | (when Δθ is positive) | |
| | = −α (Vb) | (when Δθ is negative) | (3b) |
| duty 3 | = +β (Vb) | (when t < T₀/2) | |
| | = −β (Vb) | (when t > T₀/2) | (6b) |

Further, when the hysteresis correction means 22c and the voltage correction means 22d are both introduced, the α and β of duty 2 and duty 3 are given as a function of actual hysteresis hys and a power supply voltage Vb.

| duty 2 | = +α (hys · Vb) | (when Δθ is positive) | |
| | = −α (hys · Vb) | (when Δθ is negative) | (3b) |
| duty 3 | = +β (hys · Vb) | (when t < T₀/2) | |
| | = −β (hys · Vb) | (when t > T₀/2) | (6b) |

A flowchart for the above-described operation will develope as follows. In the case of the first embodiment, the α in S308 and S309 of FIG. 3 is replaced with α (hys), α (Vb), or α (hys·Vb). In the case of the second embodiment, the β in S608 and S609 of FIG. 6 is replaced with β (hys), β (Vb), or β (hys·Vb).

Fourth Embodiment

A fourth embodiment of the present invention will hereinafter be described. While in the second embodiment it has been described that when the second duty correction means is used, friction resistance can be cancelled since the throttle valve oscillates microscopically at intervals of a predetermined cycle, this microscopic oscillation is transmitted through the rotational shaft 12 of the throttle valve to the throttle opening sensor 13.

Many of the throttle valves being widely today used are of a variable resistance type (potential type) where a brush slides on a resistant body while mechanically contacting it. In a case where the above-described microscopic oscillation is always applied during the time an automobile is operated, there is possibility that abnormal wear on the above-described resistance body occurs and life is shortened. For this reason, a non-contact type having no mechanical contact part is used in the throttle opening sensor 13.

The detection methods for a non-contact type throttle opening sensor are well known as a method using an optical device(optical type) or a method using a magnetic resistance element(magnetic type), so description thereof is omitted here.

Fifth Embodiment

A fifth embodiment of the present invention will hereinafter be described. First, a three-phase conducting method will be described with the timing diagram of FIG. 9.

Figure 9:
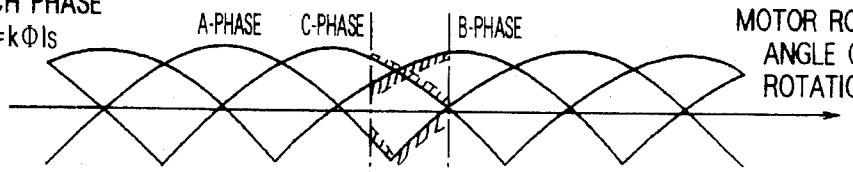
FIG. 9 is a diagram used to explain the principles of conducting methods of fifth to eighth embodiments of the present invention.
Figure 9:
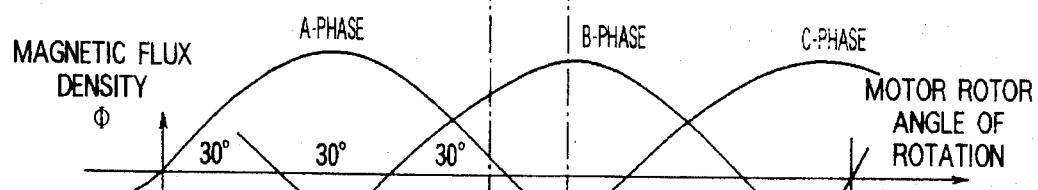
Figure 9:

In FIG. 9, if a sine wave current Is having the same phase as a magnetic flux density of sine wave, φ, and similar to φ is supplied to each phase when a rotor is rotated and each winding crosses the magnetic flux density φ, a torque Ts generated in each phase is expressed by the following equation $$Ts = k \cdot \phi \cdot Is \quad (8)$$

where k is a constant.

The rotor torque of a brushless motor is expressed by the resultant torque of the generation torques Ts of the phases A to C, and theoretically, there is obtained an output torque (indicated by solid line) having no torque ripple with respect to an angle of rotation of the rotor. Further, this method has the characteristic feature that, as shown by a broken line, a fluctuation in the rotor torque would be very small even if the detector output were shifted in the direction indicated by arrow.

Figure 10:
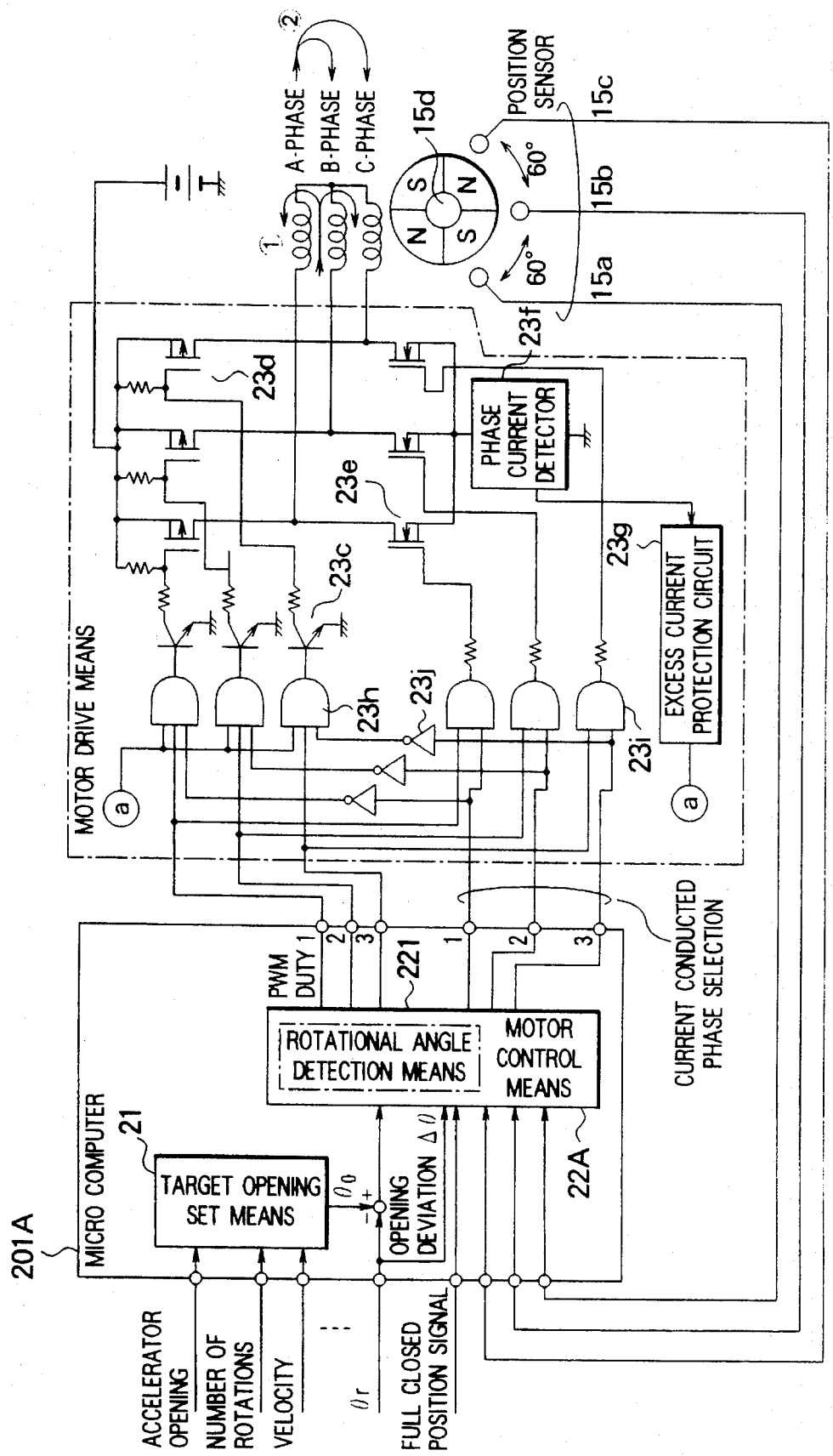
FIG. 10 is a circuit diagram showing a control unit of the fifth embodiment of the present invention.

A conducting method such as this is called a three-phase conducting method. In general, a conducting current to each phase needs to be changed with respect to the angle of rotation of a rotor by a sine wave, so the angle of rotation of a rotor has to be detected with a high degree of accuracy. It is this embodiment alone that realized a three-phase conducting method with the aid of a throttle opening sensor and an existing position sensor. The method will be described with respect to FIGS. 9 and 10. FIG. 10 is a circuit diagram showing a control unit 20, and only those parts different from the above-described first to fourth embodiments will be described.

A deviation Δθ PMW duties 1 to 3 calculated from position sensors 15a to 15c, and current conducted phase selection signals 1 to 3 are output by motor control means 22A and are transmitted to motor drive means 23A.

The motor control means 22A is provided with rotational angle detection means 221. The motor drive means 23 is provided with an AND logic group 23h for driving an upstream drive stage, an AND logic group 23i for driving a downstream drive stage, and an inverting logic group 23j in parallel with the AND logic group 23h and the current conducted phase selection signals 1 to 3 of the AND logic group 23i. The PWM duties 1 to 3 are input to the AND circuits of the AND logic group 23h, respectively. The relationship between the PWM duty and the angle of rotation of a rotor is expressed by the following equation $$PWM \text{ duty } 1 = PWM \text{ duty} \times \mathrm{Sin}\, 2\gamma \quad (9\text{-}1)$$

$$PWM \text{ duty } 2 = PWM \text{ duty} \times \mathrm{Sin}\, 2(\gamma - 60°) \quad (9\text{-}2)$$

$$PWM \text{ duty } 3 = PWM \text{ duty} \times \mathrm{Sin}\, 2(\gamma + 60°) \quad (9\text{-}3)$$

where γ represents the angle of rotation of a rotor.

Also, the current conducted phase selection signal is expressed by a function of γ.

$$\text{Current conducted phase selection signal } (1, 2, 3) = f(\gamma) \quad (10)$$

Next, the operation will be described.

The detector output is generated by position sensors 15a to 15c at intervals of the angle of rotation of a rotor being 30°. If the motor is rotated and the detector output is generated, the control unit 20 will output the PWM duties 1 to 3 and the current conducted phase selection signal so that a phase current corresponding to a magnetic flux density applied to each phase at that position is obtained.

The PWM duties 1 to 3 and the current conducted phase selection signal are output to control the motor so that, for example, at a point of (1) of FIG. 9, a current supplied from the B-phase is equally branched into the A-phase and the C-phase, and if this causes the rotor to rotate by 30°, at a point of (2) the current flows from the A-phase to the B-phase and the C-phase.

Since the detector output is inverted at the points (1) and (2), each phase current with respect to the angle of rotation of a rotor, γ, is obtained from the above-described equations (9-1), (9-2), and (9-3). However, since between the points (1) and (2) the angle of rotation of the rotor cannot be detected directly, in the rotational angle detection means 221 the current is controlled with a motor rotational angle γ obtained from an actual opening θr from the throttle opening sensor 13 and from the gear ratio ε of the speed reducer $$\gamma = \varepsilon \cdot \theta r \quad (11)$$

where ε represents the gear ratio of the speed reducer 16.

Figure 11:
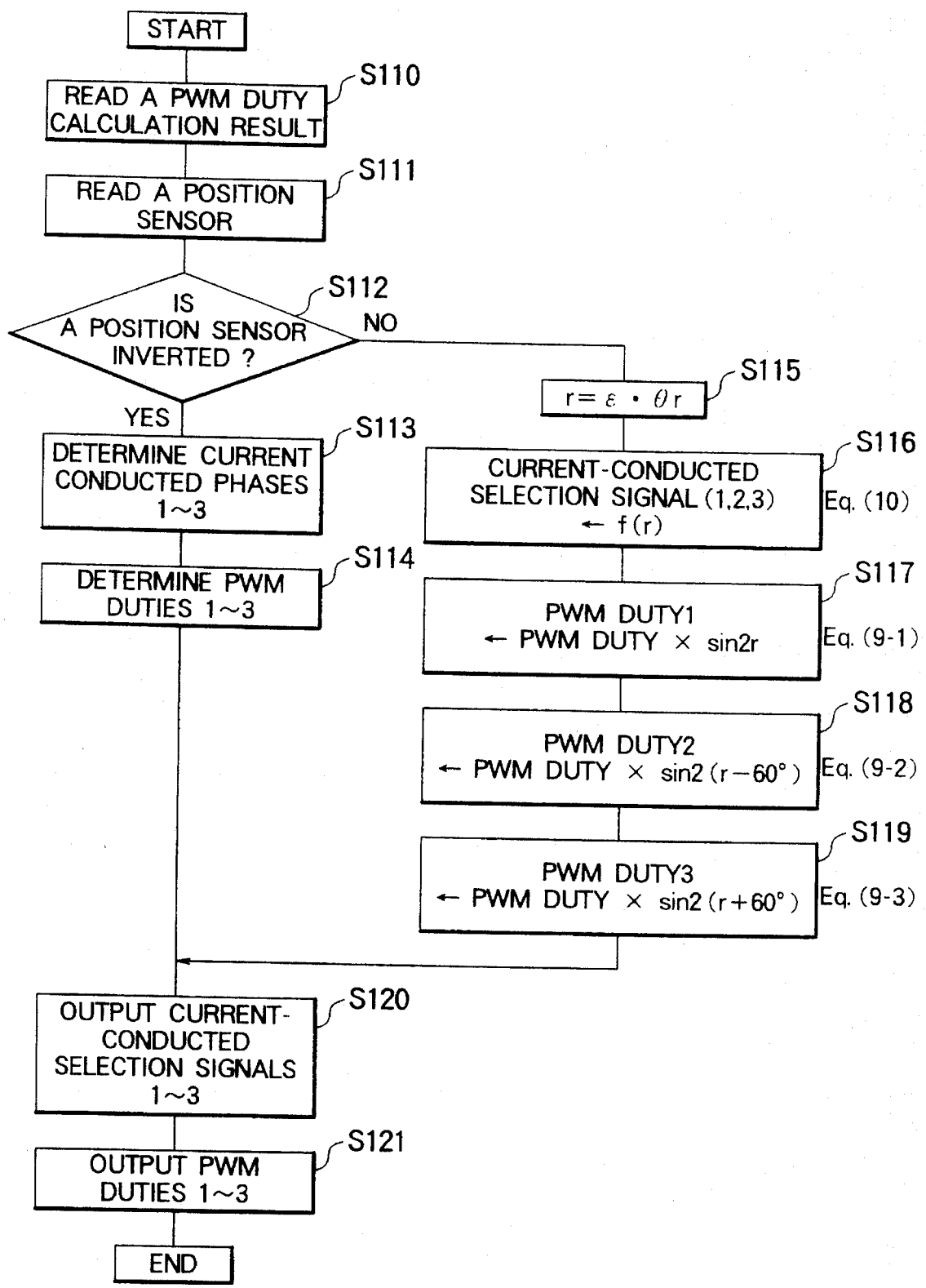
FIG. 11 is a flowchart showing the operation of the fifth embodiment.

The operation described above will develop as shown in FIG. 11.

Figure 6:
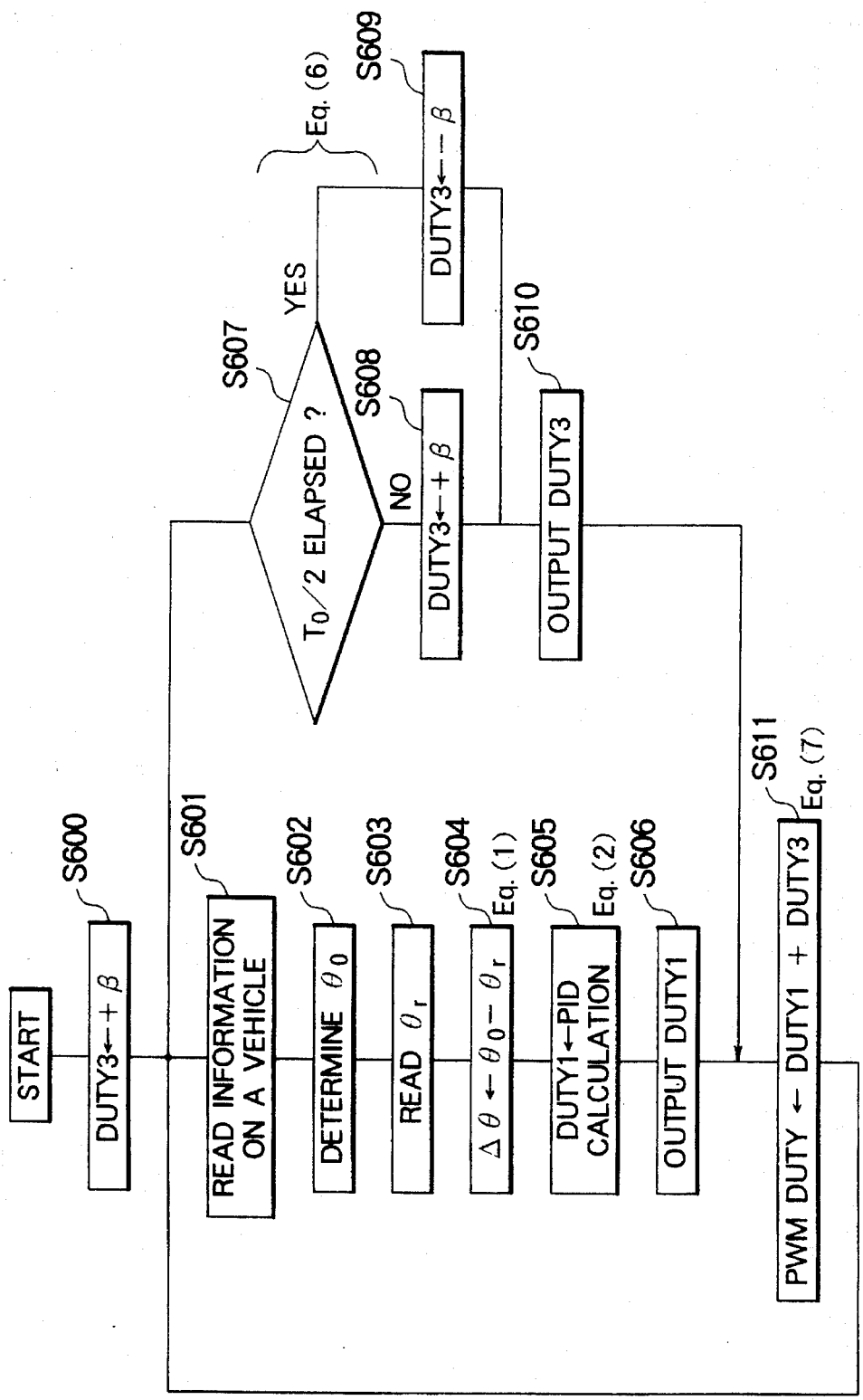
FIG. 6 is a flowchart showing how the control duty of the second embodiment is determined.

First, the PWM duty obtained with the procedure described in FIGS. 3 and 6 is read (S110), and the outputs of the position sensors 15a to 15c are read (S111). Next, it is determined if the output pattern of the position sensor has been inverted (S112). If YES, the current conducted phases 1 to 3 and the PWM duties 1 to 3 will be determined based on that output pattern (S113, S114), and the results are output (S120, S121). If, on the other hand, it is NO, S112 will advance to S115, in which a rotor rotational angle γ is obtained from Equation (11). In S116, from that rotor rotational angle γ, a current conducted phase selection signal is obtained with Equation (10) (S116). In S117, S118, and S119, from that rotor rotational angle γ, PWM duties 1 to 3 are obtained with Equations (9-1), (9-2), and (9-3). In S120 and S121, the obtained selection signals and PWM duties are output.

Sixth Embodiment

A sixth embodiment of the present invention will hereinafter be described. While in the fifth embodiment the three-phase conducting method has been constituted by an existing position sensor and throttle opening sensor, in this embodiment the three-phase conducting method is constituted with a reference position signal shown in FIG. 9.

The reference position signal in the sixth embodiment is incorporated into a brushless motor or is output by a position sensor separately provided. This position sensor outputs a pulsed signal at a point where the magnetic flux density φ applied to the A-phase zero-crosses. A control unit 20 controls the motor with the shown current conducted phase and phase current determined by this pulsed signal. Thereafter, the control unit 20 controls the current conducted and the phase current with the rotor rotational angle estimated from the output of the throttle opening sensor with Equation (11), making use of a regular change (sine wave) of a magnetic flux density to a motor rotation.

It is noted that the value of the reference signal is studied at the time of the initialization described in the third embodiment, together with the full closed and full open positions of the throttle opening sensor.

Seventh Embodiment

A seventh embodiment of the present invention, as shown in FIG. 9, is constructed so that the full closed position signal of a throttle valve is output at a position where a magnetic flux density applied to a phase, i.e., an angle of rotation of a rotor is determined. With this, the full closed position signal can be used as a reference position signal.

Eighth Embodiment

An eighth embodiment of the present invention is constructed so that a throttle opening sensor is arranged at a position where a magnetic flux density applied to a phase, i.e., an absolute value of an angle of rotation of a rotor is determined. With this, a PWM duty and a current conducted phase can be selected directly from θr.

That is, in this embodiment, the following equations are obtained by substituting Equation (11) of the sixth embodiment into Equations (9-1), (9-2), (9-3), and (10).

$$PWM \text{ duty } 1 = PWM \text{ duty} \times \sin 2\varepsilon \cdot \theta r \quad (9\text{-}1a)$$

$$PWM \text{ duty } 2 = PWM \text{ duty} \times \sin 2(\varepsilon \cdot \theta r - 60°) \quad (9\text{-}2b)$$

$$PWM \text{ duty } 3 = PWM \text{ duty} \times \sin 2(\varepsilon \cdot \theta r + 60°) \quad (9\text{-}3c)$$

$$\text{Current conducted phase selection signal } (1, 2, 3) = f(\varepsilon \cdot \theta r) \quad (10a)$$

With these equations, the control is executed.

Ninth Embodiment

While in the above-described embodiments the target opening set means 21 has been incorporated into the control unit 20, it may be provided in an other vehicle mounted unit (for example, an engine control unit) and a target opening $\theta_0$ may be transferred to the control unit 20 with the aid of a data link.

Also, while the phase current detector 23f has been arranged downstream of the downstream final stage switching element group 23e, it may be arranged upstream of the upstream final stage switching element group 23d.

Also, while in the third embodiment it has been described that actual hysteresis torque hys is obtained during initialization, the hysteresis torque hys may be obtained from the relationship between the throttle opening and the phase current during normal operation.

Also, while in the third embodiment it has been described that the correction duties α and β are expressed by functions α (hys) and β (hys) of hysteresis torque hys, functions α (Vb) and β (Vb) of power supply voltage Vb, and functions α (hys·Vb) and β (hys. Vb) of the product of hys and Vb, the correction duties α and β may be multiplied by a coefficient K having hysteresis torque hys and power supply voltage Vb as variables. That is, Equations (3a) to (3c) may be replaced with the following Equations (3d) to (3f), and Equations (6a) to (6c) may be replaced with the following Equations (6d) to (6f).

| | | |
|---|---|---|
| duty 2 = +α · K (hys) | (when Δθ is positive) | |
| = −α · K (hys) | (when Δθ is negative) | (3d) |
| duty 3 = +β · K (hys) | (when t < T₀/2) | |
| = −β · K (hys) | (when t < T₀/2) | (6d) |
| duty 2 = +α · K (Vb) | (when Δθ is positive) | |
| = −α · K (Vb) | (when Δθ is negative) | (3e) |
| duty 3 = +β · K (Vb) | (when t < T₀/2) | |
| = −β · K (Vb) | (when t < T₀/2) | (6e) |
| duty 2 = +α · K (hys · Vb) | (when Δθ is positive) | |
| = −α · K (hys · Vb) | (when Δθ is negative) | (3f) |
| duty 3 = +β · K (hys · Vb) | (when t < T₀/2) | |
| = −β · K (hys · Vb) | (when t < T₀/2) | (6f) |

Further, while the first to fourth embodiments where a hysteresis torque is corrected to obtain a device for controlling the quantity of intake air having excellent controllability, and the fifth to eighth embodiments where a device for controlling the quantity of intake air obtained have been described separately, the present invention is not limited to these embodiments. For example, by combining these embodiments, canceling hysteresis torque by the frictional resistance between sliding parts constituting a control object, which is a first object of the present invention, can be achieved. Also, a three-phase conducting method which is inexpensive and has excellent controllability, which is a second object of the present invention, can be obtained. Further, abrupt torque fluctuations, in a brushless motor that occur as a stator winding (phase) to which a current is supplied is switched, can be prevented. Therefore, it is apparent that controllability can be even further enhanced.

For example, if the control device described in the fifth embodiment is provided with the first duty correction means 22a described in the first embodiment or the second duty correction means 22b described in the second embodiment, controllability will be improved by an inexpensive three-phase conducting method. At the same time, hysteresis torque can be eliminated, and a further improvement in controllability can be realized.

Further, if the throttle opening sensor is a non-contact type when the second duty correction means 22b is used, a reduction in the life of the throttle opening sensor can be prevented.

Also, if the above-described hysteresis torque is detected from the relationship between the above-described phase current flowing through a stator and the throttle opening, as described in the fourth embodiment, and the control device is provided with the hysteresis correction means 22c for correcting a predetermined duty value that the first or second duty correction means 22a or 22b outputs or is provided with the voltage correction means 22d, controllability can further be enhanced.

What is claimed is:

1. A device for controlling the quantity of intake air to be supplied to an engine, comprising:

a throttle valve provided in an air intake passageway of the engine and supported by a rotational shaft;

a brushless motor having stator windings and a rotor coupled through a speed reducer to said rotational shaft;

a throttle opening sensor for detecting an angle of rotation of said rotational shaft to detect an actual degree of opening of said throttle valve;

a target opening set means for setting a target throttle opening based on vehicular information;

a motor control means for calculating a phase current value to be supplied to each of said stator windings based on an opening deviation between said actual opening obtained by said throttle opening sensor and said target opening set by said target opening set means, and for outputting a PWM duty corresponding to the calculated phase current value;

motor drive means for supplying a current to said brushless motor based on instructions from said motor control means; and correction means for correcting said PWM duty in accordance with a hysteresis torque produced as said throttle valve is driven.

2. The device as set forth in claim 7, wherein, when said opening deviation occurs, said correction means increases or decreases, with respect to the PWM duty output by said motor control means, a predetermined duty in accordance with the polarity of said opening deviation to correct said PWM duty.

3. The device as set forth in claim 1, wherein said correction means overlaps a predetermined duty on the PWM duty output by said motor control means, with a constant cycle to correct said PWM duty.

4. The device as set forth in claim 3, wherein said throttle opening sensor is of a non-contact type.

5. The device as set forth in claim 2 further comprising hysteresis correction means for detecting said hysteresis torque from a relationship between a phase current flowing through said stator windings and said actual throttle opening and correcting the predetermined duty value that said correction means outputs.

6. The device as set forth in claim 2 further comprising voltage correction means for correcting according to a power supply voltage the predetermined duty value that said correction means outputs.

7. A device for controlling the quantity of intake air to be supplied to an engine, comprising:

a throttle valve provided in an air intake passageway of the engine and supported by a rotational shaft;

a brushless motor having stator windings and a rotor coupled through a speed reducer to said rotational shaft;

a throttle opening sensor for detecting an angle of rotation of said rotational shaft to detect an actual opening of said throttle valve;

a target opening set means for setting a target opening of the throttle valve based on vehicle information;

rotational angle detection means for obtaining an angle of rotation of said rotor based on an output signal of said throttle opening sensor;

motor control means for independently calculating phase current values to be supplied to said stator windings, based on an output signal of said rotational angle detection means and based on an opening deviation between said actual throttle opening obtained by said throttle opening sensor and said target throttle opening set by said target opening set means, and for outputting a PWM duty corresponding to each of the calculated phase current values; and motor drive means for supplying a current to said brushless motor based on instructions from said motor control means.

8. A device for controlling the quantity of intake air to be supplied to an engine, comprising:

a throttle valve provided in an air intake passageway of the engine and supported by a rotational shaft;

a brushless motor having stator windings and a rotor coupled through a speed reducer to said rotational shaft;

a throttle opening sensor for detecting an angle of rotation of said rotational shaft to detect an actual opening of said throttle valve;

a target opening set means for setting a target opening of the throttle valve based on vehicle information;

rotational angle detection means for obtaining an angle of rotation of said rotor based on an output signal of said throttle opening sensor;

motor control means for independently calculating phase current values to be supplied to said stator windings, based on an output signal of said rotational angle detection means and based on an opening deviation between said actual throttle opening obtained by said throttle opening sensor and said target throttle opening set by said target opening set means, and for outputting a PWM duty corresponding to each of the calculated phase current values;

motor drive means for supplying a current to said brushless motor based on instructions from said motor control means; and correction means for correcting said PWM duty in accordance with hysteresis torque produced as said throttle valve is driven.

9. The device as set forth in claim 8, wherein, when said opening deviation occurs, said correction means increases or decreases the PWM duty output by said motor control means in accordance with the polarity of said opening deviation to correct said PWM duty.

10. The device as set forth in claim 8, wherein said correction means overlaps a predetermined duty on the PWM duty output by said motor control means, with a constant cycle to correct said PWM duty.

11. The device as set forth in claim 10, wherein said throttle opening sensor is of a non-contact type.

12. The device as set forth in claim 9 further comprising hysteresis correction means for detecting said hysteresis torque from a relationship between a phase current flowing through said stator windings and said actual throttle opening and correcting the predetermined duty value that said correction means outputs.

13. The device as set forth in claim 9 further comprising voltage correction means for correcting according to a power supply voltage the predetermined duty value that said correction means outputs.

14. The device as set forth in claim 8, wherein said rotational angle detection means is constituted by arranging said throttle opening sensor at a position where said angle of rotation of said rotor is determined.

15. A device for controlling the quantity of intake air to be supplied to an engine, comprising:

a throttle valve provided in an air intake passageway of the engine and supported by a rotational shaft;

a brushless motor having stator windings and a rotor coupled through a speed reducer to said rotational shaft;

a throttle opening sensor for detecting an angle of rotation of said rotational shaft to detect an actual opening of said throttle valve;

a target opening set means for setting a target opening of the throttle valve based on vehicle information;

rotational angle detection means for obtaining an angle of rotation of said rotor based on an output signal of said throttle opening sensor;

motor control means for independently calculating phase current values to be supplied to said stator windings, based on an output signal of said rotational angle detection means and based on an opening deviation between said actual throttle opening obtained by said throttle opening sensor and said target throttle opening set by said target opening set means, and for outputting a PWM duty corresponding to each of the calculated phase current values:

motor drive means for supplying a current to said brushless motor based on instructions from said motor control means; and position detection means for detecting a position of said rotor, wherein said rotational angle detection means obtains said angle of rotation of said rotor based on an output signal of said position detection means and an output signal of said throttle opening sensor.

16. A device for controlling the quantity of intake air to be supplied to an engine, comprising:

a throttle valve provided in an air intake passageway of the engine and supported by a rotational shaft;

a brushless motor having stator windings and a rotor coupled through a speed reducer to said rotational shaft;

a throttle opening sensor for detecting an angle of rotation of said rotational shaft to detect an actual opening of said throttle valve;

a target opening set means for setting a target opening of the throttle valve based on vehicle information;

rotational angle detection means for obtaining an angle of rotation of said rotor based On an output signal of said throttle opening sensor;

motor control means for independently calculating phase current values to be supplied to said stator windings, based on an output signal of said rotational angle detection means and based on an opening deviation between said actual throttle opening obtained by said throttle opening sensor and said target throttle opening set by said target opening set means, and for outputting a PWM duty corresponding to each of the calculated phase current values; and motor drive means for supplying a current to said brushless motor based on instructions from said motor control means;

wherein a reference position signal representative of a relative position between said rotor and said stator winding is determined, and said rotational angle detection means obtains said angle of rotation of said rotor, based on said reference position signal and an output signal of said throttle opening sensor.

17. The device as set forth in claim 16, wherein a fully closed position signal of said throttle valve is used as said reference position signal.

18. The device as set forth in claim 15, wherein said rotational angle detection means is constituted by arranging said throttle opening sensor at a position where said angle of rotation of said rotor is determined.

19. The device as set forth in claim 16, wherein said rotational angle detection means is constituted by arranging said throttle opening sensor at a position where said angle of rotation of said rotor is determined.

* * * * *